United States Patent
Chan et al.

(10) Patent No.: US 9,781,192 B2
(45) Date of Patent: Oct. 3, 2017

(54) DEVICE MANAGEMENT SERVICE

(71) Applicant: QUALCOMM Technologies, Inc., San Diego, CA (US)

(72) Inventors: Adrian Chan, Sunnyvale, CA (US); Chun Qing Liang, Sunnyvale, CA (US); Xiang Ma, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 14/165,066

(22) Filed: Jan. 27, 2014

(65) Prior Publication Data

US 2014/0237130 A1 Aug. 21, 2014

Related U.S. Application Data

(60) Provisional application No. 61/756,727, filed on Jan. 25, 2013, provisional application No. 61/756,748, filed on Jan. 25, 2013, provisional application No. 61/756,785, filed on Jan. 25, 2013, provisional application No. 61/798,347, filed on Mar. 15, 2013, provisional application No. 61/794,977, filed on Mar. 15, 2013.

(51) Int. Cl.
| | |
|---|---|
| G06F 15/16 | (2006.01) |
| H04L 29/08 | (2006.01) |
| H04L 29/06 | (2006.01) |

(52) U.S. Cl.
CPC ............ *H04L 67/10* (2013.01); *H04L 63/08* (2013.01); *H04L 67/141* (2013.01); *H04L 67/14* (2013.01)

(58) Field of Classification Search
USPC ........................................................ 709/217
See application file for complete search history.

(56) References Cited

U.S. PATENT DOCUMENTS

| | | | |
|---|---|---|---|
| 7,992,002 B2 | 8/2011 | Bradbury | |
| 8,015,114 B1 | 9/2011 | Nachenberg | |
| 8,234,408 B2 | 7/2012 | Jungck | |
| 8,316,135 B2 | 11/2012 | Ford | |
| 8,495,618 B1 | 7/2013 | Inbaraj et al. | |
| 8,650,283 B1 * | 2/2014 | Chang ............. | H04N 21/25875 709/224 |
| 8,745,746 B1 | 6/2014 | Jain | |
| 9,332,424 B2 | 5/2016 | Logan et al. | |
| 2002/0045437 A1 | 4/2002 | Kesler | |

(Continued)

OTHER PUBLICATIONS

International Search Report and Written Opinion—PCT/US2014/013212—ISA/EPO—dated Aug. 15, 2014.

(Continued)

*Primary Examiner* — Karen Tang
(74) *Attorney, Agent, or Firm* — Paradice & Li LLP

(57) ABSTRACT

Systems and methods are described that comprise receiving at a platform an enrollment request from a client device. The enrollment request comprises a request key and device data of the client device. Device identification is generated and issued to the client device in the absence of a previous enrollment event. A response to the client device is generated, and the response is a response to the enrollment request that includes the device identification. Subsequent sessions between the client device and the platform are controlled with the device identification.

28 Claims, 2 Drawing Sheets

(56) References Cited

U.S. PATENT DOCUMENTS

| | | |
|---|---|---|
| 2004/0030880 A1 | 2/2004 | Kitagawa |
| 2005/0125553 A1 | 6/2005 | Wu et al. |
| 2006/0080656 A1 | 4/2006 | Cain et al. |
| 2006/0106806 A1 | 5/2006 | Sperling et al. |
| 2006/0200856 A1 | 9/2006 | Salowey et al. |
| 2007/0006309 A1 | 1/2007 | Herbert et al. |
| 2007/0019236 A1 | 1/2007 | Sando |
| 2007/0050762 A1 | 3/2007 | Chen et al. |
| 2007/0226343 A1 | 9/2007 | Bishop |
| 2007/0265830 A1 | 11/2007 | Sidhu et al. |
| 2008/0005733 A1 | 1/2008 | Ramachandran et al. |
| 2008/0140714 A1 | 6/2008 | Rhoads et al. |
| 2008/0304421 A1 | 12/2008 | Ramasubramanian et al. |
| 2009/0044056 A1 | 2/2009 | Itoh |
| 2009/0144395 A1 | 6/2009 | DeSalvo |
| 2009/0177806 A1 | 7/2009 | Nishikawa |
| 2009/0199176 A1 | 8/2009 | Nath et al. |
| 2009/0282128 A1 | 11/2009 | Le et al. |
| 2010/0082792 A1 | 4/2010 | Johnson |
| 2010/0130178 A1* | 5/2010 | Bennett ............ H04L 63/30 455/414.1 |
| 2010/0228819 A1 | 9/2010 | Wei |
| 2010/0235321 A1 | 9/2010 | Shukla et al. |
| 2011/0185303 A1 | 7/2011 | Katagi et al. |
| 2011/0238988 A1 | 9/2011 | Tanaka et al. |
| 2011/0252240 A1 | 10/2011 | Freedman et al. |
| 2011/0264730 A1 | 10/2011 | Dattagupta et al. |
| 2012/0099024 A1 | 4/2012 | Ryu et al. |
| 2012/0167185 A1* | 6/2012 | Menezes ............ H04L 9/3213 726/5 |
| 2012/0191769 A1 | 7/2012 | Lovinger et al. |
| 2012/0206760 A1 | 8/2012 | Asahara |
| 2012/0207079 A1 | 8/2012 | Wang et al. |
| 2012/0216259 A1* | 8/2012 | Okamoto ............ H04L 12/4641 726/4 |
| 2013/0007190 A1* | 1/2013 | Kumar ............ H04L 61/2567 709/217 |
| 2013/0077664 A1* | 3/2013 | Lee .................... H04B 1/38 375/222 |
| 2013/0090939 A1 | 4/2013 | Robinson et al. |
| 2013/0125107 A1 | 5/2013 | Bandakka et al. |
| 2013/0191929 A1 | 7/2013 | Yin et al. |
| 2013/0198730 A1 | 8/2013 | Munireddy et al. |
| 2013/0261821 A1* | 10/2013 | Lu .................... H04L 12/2807 700/289 |
| 2014/0082117 A1 | 3/2014 | Unhale et al. |
| 2014/0133656 A1 | 5/2014 | Wurster et al. |
| 2014/0237131 A1 | 8/2014 | Chan |
| 2014/0244789 A1 | 8/2014 | Chan |
| 2015/0058834 A1 | 2/2015 | Chan |
| 2015/0067667 A1 | 3/2015 | Chan |
| 2015/0319143 A1* | 11/2015 | Kim .................... G06F 21/6281 713/171 |

OTHER PUBLICATIONS

International Search Report and Written Opinion—PCT/US2014/030336—ISA/EPO—dated Oct. 23, 2014.

* cited by examiner

DEVICE MANAGEMENT SERVICE

RELATED APPLICATIONS

This application claims the benefit of United States (U.S.) Patent Application No. 61/756,727, filed Jan. 25, 2013.

This application claims the benefit of U.S. Patent Application No. 61/756,748, filed Jan. 25, 2013.

This application claims the benefit of U.S. Patent Application No. 61/756,785, filed Jan. 25, 2013.

This application claims the benefit of U.S. Patent Application No. 61/798,347, filed Mar. 15, 2013.

This application claims the benefit of U.S. Patent Application No. 61/794,977, filed Mar. 15, 2013.

TECHNICAL FIELD

The embodiments herein relate to processing systems and, more particularly, to methods and apparatus to uniquely identify and communicate with client devices to provide care service regardless of location of the client device.

BACKGROUND

Systems and methods are needed to perform initial provisioning of client devices that are managed by remote applications.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

One or more of a system, device or apparatus, and method is described in which a unique identification is issued to each device. The unique identification, which is referred to herein as innodevID, is issued to each device that is brought to a mobile device management service of a service provider. The mobile device management service of an embodiment is referred to herein as a care service or, alternatively, an activeCare service. Communication with the device is enabled using a pre-specified address convention. Communication with the device in an embodiment uses but is not limited to the following address convention: innodevID@service_domain/serviceID. This address convention is used for example to send and receive real-time device control command or device information to and from the device and the activeCare service platform. The serviceID portion or component of the address convention is an identification number that is used to represent the logical active session ongoing between the device and the servicing agent during the service call.

Although the detailed description herein contains many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, the claimed invention.

Figure 1:
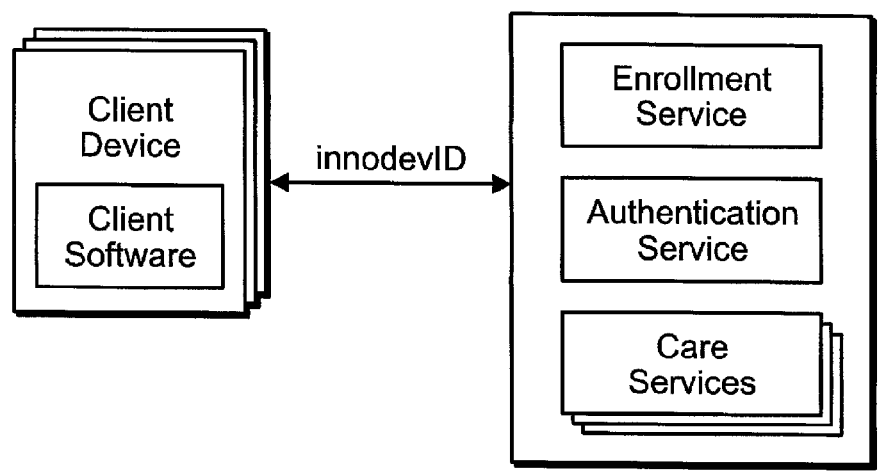
FIG. 1 is a block diagram of a device management service, under an embodiment.

FIG. 1 is a block diagram of a device management service, under an embodiment. The device management service includes a platform, system and/or components comprising one or more of an enrollment service, authentication service and care services or care applications, all of which are described in detail herein. The device management service communicates with one or more client devices, each hosting client software. Communication between the device management service and the client devices involves the use of a unique identification, referred to herein as innodevID, as described in detail herein.

Figure 2:
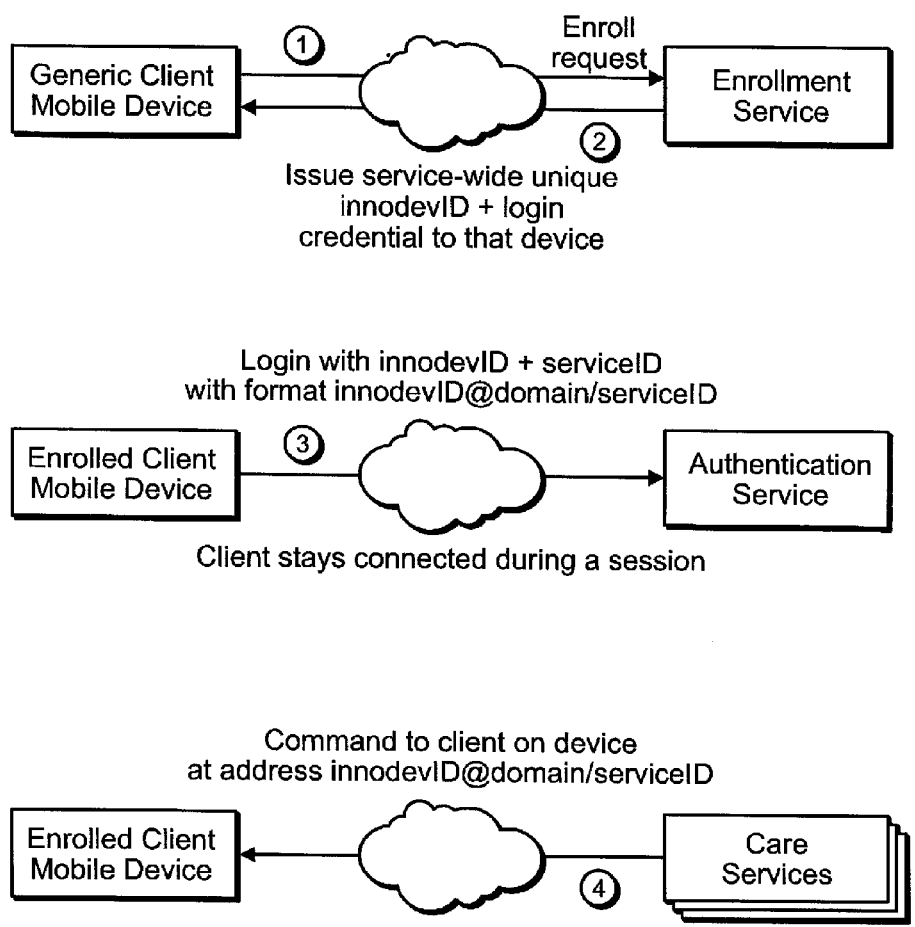
FIG. 2 is a flow diagram for provisioning a client device and assigning a universal identification to the client device, under an embodiment.

FIG. 2 is a flow diagram for provisioning a client device and assigning a universal identification the client device, under an embodiment. The universal identification assigned to the client device is used by care applications in management of the device, as described below. The client device includes any portable communication device having a wired and/or wireless communication interface by which the device interacts with one or more care applications in a local or remote environment, but is not so limited. The client device couples or connects to the care applications using a communication path that includes any medium for communicating among the computing systems including, but not limited to, wireless couplings and/or connections, wired couplings and/or connections, and hybrid wireless/wired couplings and/or connections. The care services are provided by care applications that include but are not limited to applications hosted on one or more local desktop computers and/or server computers. Further, the care applications include one or more services including but not limited to public services, private services, and/or personal services deploying as cloud or non-cloud based services.

The client device of an embodiment includes one or more applications or modules, referred to herein as client software or software, downloaded from a software distribution service via a communication path and installed on the client device. The client software is loaded onto the device via a user-initiated download from a software distribution program, for example. Alternatively, the client software is loaded onto the device via an automatic download, but the embodiment is not so limited.

As yet another alternative, the client software can be loaded onto the device using a hybrid procedure that includes an automatic procedure combined with some user action. In but one example of a hybrid procedure, the care services send to the client device an electronic message (e.g., electronic mail, SMS, etc.) that includes a link or icon for use in downloading the client software. Following receipt of the electronic message, the user clicks or selects the link or icon in the message and this user action initiates the download of the client software.

Once loaded onto a host client device, the client software of an embodiment is instructed to initiate an enrollment request to a care application but is not so limited. Alternatively, the client software self-recognizes its pre-enrollment state and in response initiates an enrollment request to a care application.

The enrollment request of an embodiment includes a set of information including but not limited to a prearranged enrollment request key and client device-specific information. The device information includes one or more of mobile device identification number, device manufacturer, manufacturer serial number, model number, International Mobile Subscriber Identity (IMSI), International Mobile Station Equipment Identity (IMEI), Mobile Subscriber Integrated Services Digital Network-Number (MSISDN), Ethernet Media Access Control (MAC) address, carrier information, and additional information describing the state of the client device, for example. The information of the enrollment request is sent to the care enrollment service. The care enrollment service upon receiving an enrollment request uses the client device information included in the enrollment request along with information of a knowledge base to which it is coupled to determine if the client device has previously been enrolled.

If a determination is made that the requesting client device has not been enrolled, a unique device identification number, referred to herein as innodevID, is generated by the care application in the application domain. Once generated, the innodevID is issued and assigned to the particular requesting client device. In the case where the enrollment service is hosted or running in multiple locations, such as regional data centers, the unique device identification number includes additional information identifying the location generating the unique device identification number. If a determination is made that the requesting client device has previously been enrolled, then the unique device identification number previously issued during the enrollment is again returned to the requesting client device.

The care enrollment service responds to the enrollment request with the assigned unique device identification number along with an encrypted login credential. The login credential is used for any service request to the care application. Upon receipt of the enrollment response from the care enrollment service, the client software stores the unique device identification and login credential for subsequent use in future service requests. In further response to receipt of the enrollment response, the client software couples or connects to the care application using the unique device identification and the login credential over a secure communication channel such as transport layer security (TLS) and secured sockets layer (SSL), but is not so limited.

Once the requesting client device receives the unique device identification number from the device management service, the care application and its modules or components communicate with the client device using this unique device identification. The unique device identification of an embodiment is in the form of innodevID@domain/serviceID.

The service ID component of the device identification, referred to herein as the service identification notation, is a string of characters and/or numbers assigned to identify an active session between the client device and the care application. As such, the care application and its modules communicate with the client device using this unique device identification regardless of a current location of the client device and regardless of a location of the application modules. Furthermore, the established communication session or path remains connected from the logical perspective of both the client software and the care application until such time as one of the client software and the care application terminate the application session and disconnect the coupling or connection. For example, the client device can connect to the care service via a mobile data network at the start of a session; and during the session the client device switches and connects to a WiFi network. Regardless of the change in the connection during the session, the care application continues to address the client software using the assigned unique client device identifier.

As described above, computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The device management service can be a component of a single system, multiple systems, and/or geographically separate systems. The device management service can also be a subcomponent or subsystem of a single system, multiple systems, and/or geographically separate systems. The device management service can be coupled to one or more other components (not shown) of a host system or a system coupled to the host system.

One or more components of the device management service and/or a corresponding system or application to which the device management service is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the device management service can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the device management service and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the device management service and corresponding systems and methods include: microcontrollers with memory (such as electronically erasable programmable read only memory (EEPROM)), embedded microprocessors, firmware, software, etc. Furthermore, aspects of the device management service and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the device management service and corresponding systems and methods is not intended to be exhaustive or to limit the systems and methods to the precise forms disclosed. While specific embodiments of, and examples for, the device management service and corresponding systems and methods are described herein for illustrative purposes, various equivalent modifications are possible within the scope of the systems and methods, as those skilled in the relevant art will recognize. The teachings of the device management service and corresponding systems and methods provided herein can be applied to other systems and methods, not only for the systems and methods described above.

The elements and acts of the various embodiments described above can be combined to provide further embodiments. These and other changes can be made to the device management service and corresponding systems and methods in light of the above detailed description.

What is claimed is:

1. A method of providing care service to a client device, the method performed by a platform remote to the client device and comprising:
   receiving, from the client device, an enrollment request including a request key and device data of the client device;
   generating, in the absence of a previous enrollment event by the client device, a device identification in the platform;
   issuing, to the client device, a response to the enrollment request that includes the device identification; and
   controlling subsequent sessions between the client device and the platform using an address convention comprising the device identification generated by the platform, the address convention comprising a form including device_identification@service domain/service identification.

2. The method of claim 1, wherein the platform is a care service platform comprising a plurality of care applications configured to provide device management services to a plurality of client devices including the client device.

3. The method of claim 1, wherein the address convention includes a service identification component that represents a logical active session between the client device and the platform.

4. The method of claim 3, wherein the address convention further includes a service domain identification component.

5. The method of claim 1, wherein the enrollment request is initiated in a client application hosted on the client device.

6. The method of claim 5, further comprising:
   instructing the client application to initiate the enrollment request.

7. The method of claim 1, wherein the device data comprises at least one of a device identification number, a device manufacturer, a manufacturer serial number, a model number, International Mobile Subscriber Identity (IMSI), International Mobile Station Equipment Identity (IMEI), Mobile Subscriber Integrated Services Digital Network-Number (MSISDN), a media access control (MAC) address, carrier data of a carrier corresponding to the client device, and state data of the client device.

8. The method of claim 1, further comprising:
   identifying a previous enrollment event of the client device using the device data; and
   including, in the response, the device identification issued to the client device during the previous enrollment event.

9. The method of claim 1, wherein the device identification includes location data of a location from which the device identification is issued.

10. The method of claim 1, wherein the response includes an encrypted login credential.

11. The method of claim 10, wherein the device identification and the encrypted login credential are stored in the client device.

12. The method of claim 1, further comprising:
    establishing a session between a client application of the client device and the platform upon receipt of the response.

13. The method of claim 1, wherein a subsequent session established between the platform and the client device remains connected logically until one of the platform and the client device terminates the session, regardless of connection point location of the client device.

14. The method of claim 3, wherein the service identification component remains constant when the client device switches a connection to the platform between a mobile data network and a Wi-Fi network.

15. A platform for providing care service to a client device, the platform remote to the client device and comprising:
- a processor; and
- a memory storing one or more programs that, when executed by the processor, cause the platform to perform operations comprising:
  - receiving, from the client device, an enrollment request including a request key and device data of the client device;
  - generating, in the absence of a previous enrollment event by the client device, a device identification in the platform;
  - issuing, to the client device, a response to the enrollment request that includes the device identification; and
  - controlling subsequent sessions between the client device and the platform using an address convention comprising the device identification generated by the platform, the address convention comprising a form including device identification@service domain/service identification.

16. The platform of claim 15, wherein the platform is a care service platform comprising a plurality of care applications configured to provide device management services to a plurality of client devices including the client device.

17. The platform of claim 15, wherein the address convention includes a service identification component that represents a logical active session between the client device and the platform.

18. The platform of claim 17, wherein the address convention further includes a service domain identification component.

19. The platform of claim 15, wherein the enrollment request is initiated in a client application hosted on the client device.

20. The platform of claim 19, wherein execution of the one or more programs causes the platform to perform operations further comprising:
instructing the client application to initiate the enrollment request.

21. The platform of claim 15, wherein the device data comprises at least one of a device identification number, a device manufacturer, a manufacturer serial number, a model number, International Mobile Subscriber Identity (IMSI), International Mobile Station Equipment Identity (IMEI), Mobile Subscriber Integrated Services Digital Network-Number (MSISDN), a media access control (MAC) address, carrier data of a carrier corresponding to the client device, and state data of the client device.

22. The platform of claim 15, wherein execution of the one or more programs causes the platform to perform operations further comprising:
- identifying a previous enrollment event of the client device using the device data; and
- including, in the response, the device identification issued to the client device during the previous enrollment event.

23. The platform of claim 15, wherein the device identification includes location data of a location from which the device identification is issued.

24. The platform of claim 15, wherein the response includes an encrypted login credential.

25. The platform of claim 24, wherein the device identification and the encrypted login credential are stored in the client device.

26. The platform of claim 15, wherein execution of the one or more programs causes the platform to perform operations further comprising:
establishing a session between a client application of the client device and the platform upon receipt of the response.

27. The platform of claim 15, wherein a subsequent session established between the platform and the client device remains connected logically until one of the platform and the client device terminates the session, regardless of connection point location of the client device.

28. The platform of claim 17, wherein the service identification component remains constant when the client device switches a connection to the platform between a mobile data network and a Wi-Fi network.

* * * * *